(12) United States Patent
Usami

(10) Patent No.: US 6,463,670 B1
(45) Date of Patent: Oct. 15, 2002

(54) TAPE MEASURE

(75) Inventor: Tsutomu Usami, Moriyama (JP)

(73) Assignee: KOS Corporation (JP)

( * ) Notice: Subject to any disclaimer, the term of this patent is extended or adjusted under 35 U.S.C. 154(b) by 0 days.

(21) Appl. No.: 09/646,516

(22) PCT Filed: Jan. 18, 2000

(86) PCT No.: PCT/JP00/00200

§ 371 (c)(1),
(2), (4) Date: Sep. 15, 2000

(87) PCT Pub. No.: WO00/42378

PCT Pub. Date: Jul. 20, 2000

(30) Foreign Application Priority Data

Jan. 18, 1999 (JP) .......................................... 11-009652

(51) Int. Cl.⁷ .................................................. G01B 3/10
(52) U.S. Cl. ........................................... 33/767; 33/755
(58) Field of Search ................................... 33/767, 755

(56) References Cited

U.S. PATENT DOCUMENTS

| | | | |
|---|---|---|---|
| 3,578,259 A | 5/1971 | Zelnick | 242/107.2 |
| 3,942,738 A | 3/1976 | Rutty | 242/107.2 |
| 5,575,077 A | 11/1996 | Tae | 33/767 |
| 6,032,896 A * | 3/2000 | Liu | 33/767 |
| 6,167,635 B1 * | 1/2001 | Lin | 33/767 |
| 6,272,764 B1 * | 8/2001 | Lin | 33/767 |
| 6,276,071 B1 * | 8/2001 | Khachatoorian | 33/767 |

FOREIGN PATENT DOCUMENTS

| | | | | |
|---|---|---|---|---|
| EP | 000531570 A | * | 3/1993 | 33/767 |
| JP | 51-29855 | | 3/1976 | |
| JP | 59-47802 | | 3/1984 | |
| JP | 4-21802 | | 2/1992 | |
| JP | 1194002 A | | 7/1999 | |
| JP | 11295002 A | | 10/1999 | |

* cited by examiner

Primary Examiner—Christopher W. Fulton
(74) Attorney, Agent, or Firm—John R. Benefiel

(57) ABSTRACT

A tape measure is described that is easy to handle, and capable of applying a brake on a winding drum and locking a measurement tape in an unwound condition by manipulation of a single flexible operating member (7) having a knob (4) thereon. A lock element (8) is provided on a forward portion of the operating member (7) and a brake element (9) is provided on a rear portion thereof. In a normal condition, the measurement tape (5) is freely unwindable, and after the tape pulled out, it is rewound by a spring (not shown). When the knob (4) is in a rearward circumferential position, and the knob (4) is pressed in during rewinding, the operating member (7) is deflected to cause the brake element (9) to contact an edge of the winding drum (6), thereby retarding the rewinding of the tape (5). If the knob (4) is moved to a forward position while the tape is in an extended position, then the operating member (8) is deflected to cause the lock element (8) to force the tape (5) against a receiving section (18) so that the tape (5) is locked in the extended position.

18 Claims, 4 Drawing Sheets

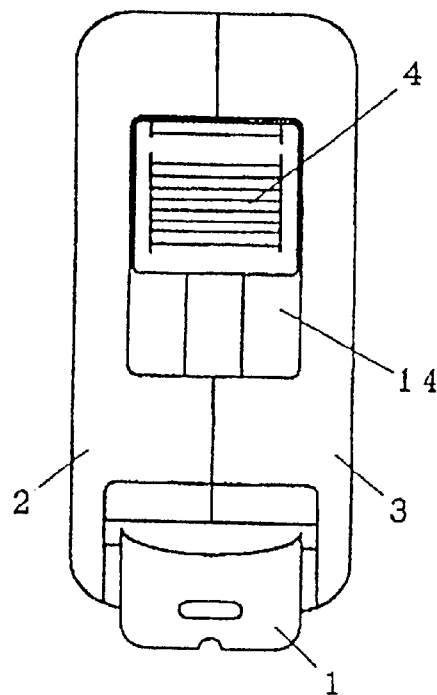
FIG. 1
FIG. 2A
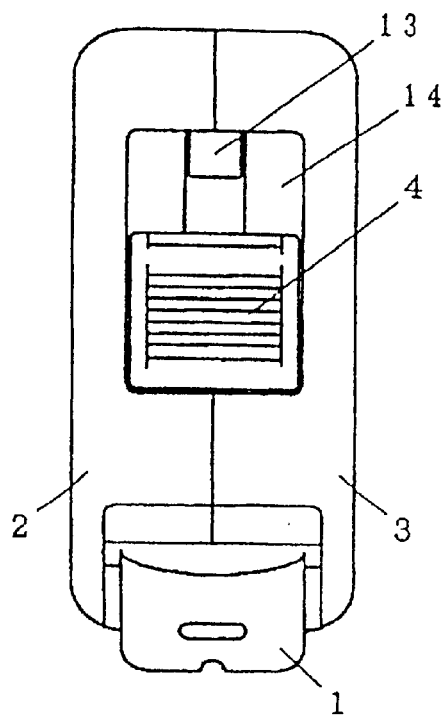
FIG. 2B
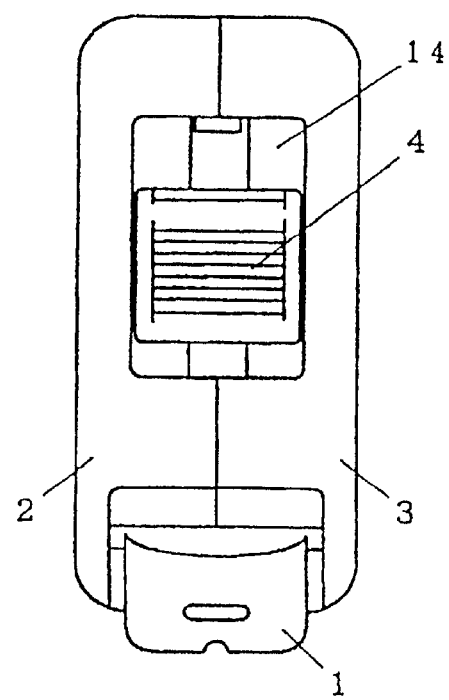

TAPE MEASURE

TECHNICAL FIELD

The present invention relates to a tape measure wherein a flexible measuring tape is accommodated in a case.

BACKGROUND ART

A tape measure including a flexible measuring tape accommodated inside a case is wound about a winding drum inside the case. A tension spring is attached to the winding drum, and when the measuring tape is pulled out, this spring is tensioned and stores a spring force. When the user releases his or her hand from the pulled out measuring tape, it automatically winds up into the case, due to the force of the spring.

However, in the winding up operation, as an accelerating force is applied, the speed of winding of the measuring tape gradually increases, and in addition to this, the increase in the winding speed is also promoted by the growth of the winding diameter as the tape is wound in, thereby leading to problems in that the measuring tape becomes twisted, or strikes the fingers of the person holding the case, or the like.

As a countermeasure to this, tape measures incorporating a braking mechanism are used in order to suppress the winding speed.

Moreover, a problem also arises in that, when measuring with the measuring tape in an extracted state, the measuring tape may be retracted into the case unintentionally. Therefore, tape measures are also used which incorporate a locking mechanism in addition to the aforementioned braking mechanism, the tape measure being lockable by operating this mechanism, in such a manner that the extracted tape cannot be retracted from a desired position.

In the tape measure described in Japanese Patent Application Laid-Open Publication No. 10-89901, a brake button is provided on the side face of a case, and by pressing on this brake button with a finger, the brake button engages with a side face of a winding drum, thereby halting or braking the rotation of the winding drum.

A brake button is also provided on the upper portion of the front face of the case, and by pressing this brake button with a finger, the brake button engages with a side face of the winding drum (collar of the winding drum), and hence it can also be used for the function of halting or braking the rotation of the winding drum.

In the tape measure described in Japanese Utility Model Application After-Examination Publication No. 49-39338, by extending one side of the rotating axle of a winding drum to the outer side of a case, by means of a circular hole provided in a side face of the case, a mechanism for halting or braking the rotation of the winding drum is provided, by directly touching a finger against the winding drum.

These braking mechanisms apply a braking action by frictional contact of a member or a finger against the winding drum, but they do not provide a locking mechanism. Although it is possible to halt the measuring tape when extended, by continuous operation of the braking mechanism, since the measuring tape winds in when the user releases his or her hand, this is problematic in that it makes measurement difficult to perform.

In the tape measure described in Japanese Utility Model Application After-Examination Publication No. 41-10935, an elastic braking member is provided slidably on the inner side of the front wall of a case, and by a downward operation of this braking member, the measuring tape is wedged against the case wall and held in its extended state.

In the tape measures described above, it is possible to apply a brake whilst retracting the extended tape, by reducing the pressing amount of the elastic braking member, but this entails a problem in that the measuring scale may become worn by means of the end portion of the elastic braking member rubbing against the measuring tape moving at high speed.

In the tape measure disclosed in Japanese Utility Model Application Laid-Open No. 59-47802, in addition to a locking mechanism similar to that in the tape measure described in Japanese Utility Model Application After-Examination Publication No. 41-10935, a curved braking elastic piece is provided, which provides braking by making contact with a drum, but since the locking mechanism and braking mechanism are constituted by separate parts, there is a problem in that the number of components increases.

The present invention was devised with the foregoing in view, an object thereof being to provide a tape measure having simple operation, wherein a brake can be applied to a winding drum, and furthermore, an extracted measuring tape can be locked in position, by means of a single component.

DISCLOSURE OF THE INVENTION

According to the present invention, there is provided a tape measure having an operating member installed to be movable on the side of a main case, and including a braking piece in the rear portion thereof and a locking piece in the front portion thereof, wherein a braking action is provided by means of the braking piece making contact with the periphery of a winding drum when the operating member is pressed radially inward when in a rearward circumferential position of the operating member, and a measuring tape is locked by means of the locking piece being pressed against the measuring tape when the operating member is moved to a forward circumferential position thereof.

Preferably, the operating member includes a lock position holding projection, and the operating member is held in a lock position by means of the lock position holding projection engaging with the main case, when the operating member is moved to the forward position.

Preferably, an engaging member which is engageable with an engaging member provided on the main case is provided in the rear portion of the operating member.

Preferably, the operating member has a curved shape which follows the outer circumference of the winding drum.

Preferably, the operating member is made from a flexible material.

Preferably, the operating member is made from a synthetic resin, such as polyacetal, or the like.

Preferably, the main case includes a receiving section in order that the measuring tape can be held between the locking piece and the receiving section.

Preferably, a guide section for guiding the movement of the operating member is provided in the main case, and the side faces of the operating member are slidably in contact with the guide section.

Preferably, a pair of the guide sections are provided on the inner side and outer side in the radial direction, a groove being formed in the position between these guide sections, and a flange section provided on the operating member being accommodated in the groove.

Preferably, a lock position holding projection is provided on the flange section, and the lock position holding projection engages with the end portion of the guide section provided on the inner side in the radial direction, whereby the measuring tape is held in a lock position.

The present invention also provides a tape measure that includes a winding drum having a tension spring for automatically winding in a drawn out measuring tape, accommodated inside a main case, and an operating member for imparting a braking or locking action by making contact with the winding drum or the measuring tape. The operating member is installed to be movable circumferentially in a forward and backward direction on the main case. The operating member is formed in a curved shape from a flexible material, a braking piece being provided in the rear portion of the operating member, a locking piece being provided in the front portion thereof, and a knob projecting from the main case being provided in the middle portion thereof when the operating member is in a rearward position, and released it assumes a state of non-contact with either the winding drum or the measuring tape, thereby allowing the measuring tape to be drawn out or wound in freely, when the operating member is pressed radially inward the rear portion is deflected and the braking piece makes contact with the periphery of the winding drum, thereby applying a brake to the measuring tape. When the knob is pressed from the aforementioned state towards the inside of the main case. When operating member is moved circumferentially to an intermediate forward position, the locking piece makes contact with the measuring tape, thereby applying a brake to the measuring tape. When the knob is pressed forwards to an intermediate position. When operating member is moved to a forward circumferential position the front portion becomes deflected, and the measuring tape is held between the locking piece and the main case, thereby locking the measuring tape.

Preferably, the operating member includes a lock position holding projection, and the lock position holding projection engages with the main case, thereby holding the operating member in a lock position, when the operating member is moved to the forward position.

Preferably, an engaging section which is engageable with an engaging section provided on the main case is provided in the rear portion of the operating member, the engaging section of the operating member being engaged, thereby restricting the forward and backward movement of the operating member, in a normal state where the knob is released, and the engagement being released when pressure is applied to the knob.

Preferably, the operating member has a curved shape following the outer circumference of the winding drum.

Preferably, the main case includes a receiving section in order that the measuring tape can be held between the locking piece and the receiving section.

Preferably, a guide section for guiding the movement of the operating member is provided in the main case, and the side faces of the operating member are slidably in contact with the guide section.

Preferably, a pair of the guide sections are provided on the inner side and outer side in the radial direction, a groove being formed in the position between these guide sections, and a flange section provided on the operating member being accommodated in this groove.

Preferably, a lock position holding projection is provided on the flange section, and the lock position holding projection engages with the end portion of the guide section provided on the inner side in the radial direction, thereby locking the measuring tape in position.

BRIEF DESCRIPTION OF THE DRAWINGS

FIG. 1 illustrates a front view of one embodiment of a tape measure according to the present invention;

FIG. 2A illustrates a front view of the same, showing a state where a knob has been moved to a forward position;

FIG. 2B illustrates a front view of the same, showing a state where a knob has been slightly forwards from a lock position;

BEST MODE FOR CARRYING OUT THE INVENTION

Figure 3:
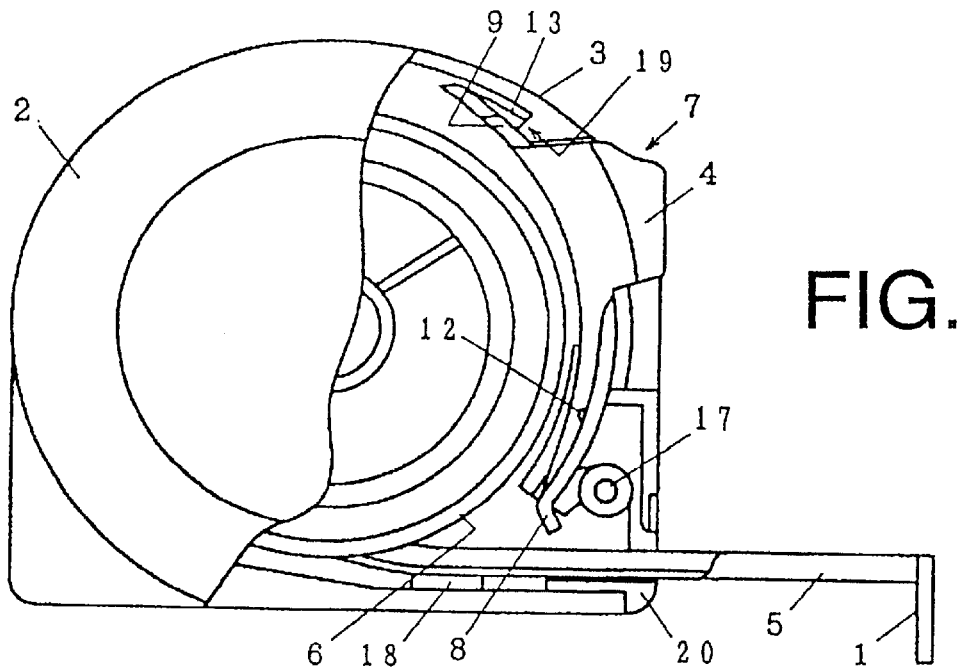
FIG. 3 illustrates a side view of a tape measure, wherein a portion of the main case has been cut away in order to illustrate the interior thereof.

Below, an embodiment of the present invention is described in reference to the drawings.

Referring to FIG. 1, illustrated is a front view of one embodiment of a tape measure according to the present invention. In this diagram, reference numeral 1 designates a hook provided on the front end of a measuring tape, reference numerals 2, 3 designate components of the main case, which has a two-part split construction, and reference numeral 4 designates a knob. The knob 4 is provided on an operating member, which is described hereinafter, and when the knob 4 is in an non-operated state, a user can draw out a measuring tape (not illustrated), freely, by engaging his or her finger with the hook 1, and furthermore, if the user releases his or her finger from the extracted measuring tape, then the measuring tape is wound in by a spring force that is stored in a tension spring when the measuring tape is drawn out.

If the knob 4 is located in a rearward position, as illustrated in FIG. 1, then by pressing the knob 4 radially inward towards the inside of the main case 2, 3, it is possible to impact a braking action by means of a braking piece of the operating member on which the knob 4 is provided pressing against a winding drum, and therefore it is possible to apply a brake to the measuring tape being wound in by the force of the tension spring, thereby reducing the winding speed of the measuring tape. Moreover, by pressing the knob 4 and applying a brake whilst the measuring tape is in an extended state, it is also possible to stop the measuring tape in any extended position, temporarily.

FIG. 2A illustrates a state where the knob 4 has been moved to a forward circumferential position. In this state, the operating member is locked, and even if the user releases his or her finger from the knob 4, it is not able to return to the position in FIG. 1, and a locking piece of the operating member presses against the measuring tape, thereby locking the extended tape in position. When the knob 4 is at the position shown in FIG. 2B, slightly away from the forward position, or locking position, then the locking piece of the operating member presses against, and halts, the measuring tape. In this way, it is possible to halt the measuring tape in a temporary fashion. When the finger is removed from the knob 4, this halted state is released.

Figure 4:
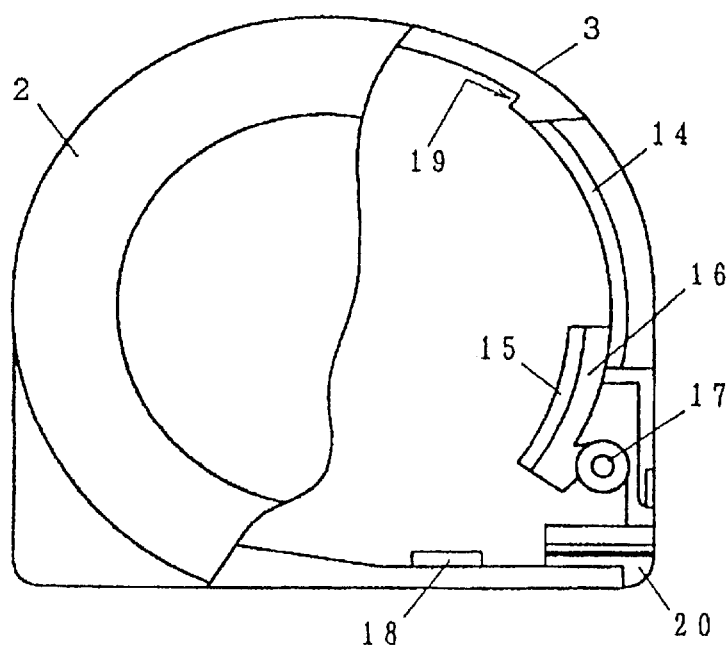
FIG. 4 is a side view of a main case wherein a portion of the main case has been cut away in order to illustrate the interior thereof.
Figures 5A, 5B, 5C:
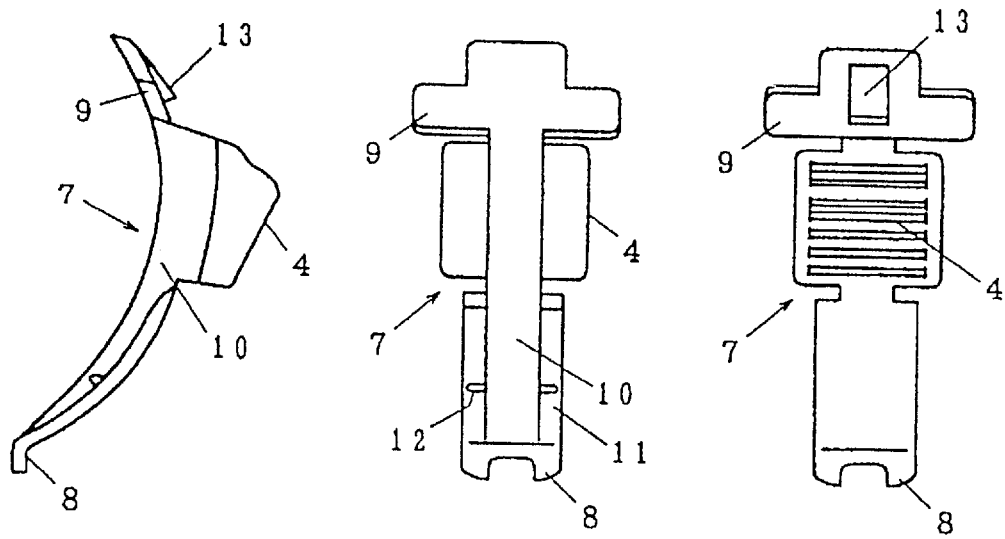
FIG. 5A is a side view of an operating member for the purpose of describing same.
FIG. 5B illustrates a diagram showing the operating member shown in FIG. 5A, as viewed from the left-hand side.
FIG. 5C illustrates a diagram showing the operating member shown in FIG. 5A, as viewed from the right-hand side.

Next, a description is given of the internal structure of the tape measure according to the embodiment illustrated in FIG. 1, FIG. 2A and FIG. 2B. FIG. 3 is a side view of a tape measure wherein a portion of the main case 3 has been cut away to reveal the interior thereof, and FIG. 4 is a side view of the main case wherein a portion of the main case 3 has been cut away to reveal the interior thereof. Moreover, FIGS. 5A, 5B and 5C illustrate the operating member, FIG. 5A being a side view of the operating member, FIG. 5B being a left-hand side view of the operating member in FIG. 5A, and FIG. 5C being a right-hand side view of the operating member in FIG. 5A. In these diagrams, sections which are the same as in FIGS. 1, 2A and 2B are similarly labelled, and description thereof is omitted here. Reference numeral 5 denotes a measuring tape, 6 a winding drum, 7 an operating member, 8 a locking piece, 9 a braking piece, 10 a guided section, 11 a flange section, 12 a lock position holding projection, 13 an engaging section, 14 and 15 guide sections, 16 a groove, 17 a screw hole, 18 a receiving section, 19 an engaging section, and 20 an elastic member.

As illustrated in FIG. 3, a measuring tape 5 wound about a winding drum 6 is accommodated inside the main case 2, 3. A spring (not illustrated) is provided between the winding drum 6 and the central axle thereof, and as described previously, this spring becomes tensioned when the measuring tape 5 is extracted, and the extracted measuring tape 5 can be wound in automatically by the force of this spring. An operating member 7 is mounted to the front side face of the main case 2, 3. This front side face is the face in which an exit hole for the measuring tape 5 is provided, and the user is able to operate the knob 4 of the operating member 7, whilst drawing out the measuring tape 5, and observing its winding state. The knob 4 projects in a forward direction from the main case 2, 3. The various operations illustrated in FIGS. 1, 2A and 2B can be achieved by controlling the operating member 7, but before describing the mechanism thereof, further description of the operating member 7 will be given.

As shown in FIGS. 5A, SB and SC, the operating member 7 has a curved shape, approximately following the outer circumference of the winding drum, and it is made in an integral fashion from a flexible material, for example, a synthetic resin, such as polyacetal, or the like. Horizontal grooves are formed on the surface of the knob 4 to prevent slipping, and a locking piece 8 is formed to the forward side thereof (the downward direction in the diagram, but termed the 'forward' direction because the operating member 7 advances in this direction), whilst a braking piece 9 is provided on the rearward side of the knob 4 (the upward direction in the diagram, but termed the 'rearward' direction, because the operating member 7 retracts in this direction).

This guided section 10 is held movably in a guide section of the main case (described hereinafter), whereby the operating member 7 can be guided by the guide section of the main case when it is moved. A suitable structure for this guide section should be adopted so that the operating member 7 is movable circumferentially in the forward and rearward directions. A flange section 11 and a lock position holding projection 12 are formed on a portion of the operating member 7 An engaging section 13 is provided in order that the operating member 7 can be held when it is in the rearward position.

Circumferential guide sections 14, 15 are formed on the inner side of the main case 2, 3 shown in FIG. 4. The guiding faces of the guide sections 14, 15 lie in the same plane, and they are slidably in contact with the sides of the guided section 10 of the operating member 7 described above, thereby guiding the circumferential forward and backward movement of the operating member 7. A groove 16 is formed on the outer side of the guide section 15, in the radial direction thereof. This groove 16 is provided in order that the flange section 11 may enter therein when the operating member 7 is fitted into the guide sections 14, 15. The width of this groove 16 enables the flange section 11, which is provided with a lock position holding projection 12, to pass through same. The screw hole 17 is a hole into which a fixing screw for fixing the two main case components 2, 3 is installed, and it may be provided in a separate location, as appropriate. The receiving section 18 is provided in order to receive the rear face of the measuring tape, when the locking piece 8 of the operating member 7 is pressed against the measuring tape. The engaging section 19 serves to halt the engaged section 13 of the operating member 7. The elastic member 20 serves to receive the hook 1 and ease the shock thereof, when the measuring tape is wound in.

In FIG. 4, the inside of one part of the main case 3 is shown, and the interior structure of the other part of the main case 2 is not illustrated, but the interior structure of this other part of the main case 2 is symmetrical to the interior structure of this part of the main case 3, and the various sections in this part of the main case 3 are provided in a similar fashion therein. Moreover, with the exception of the elastic member 20, the various sections of the main case 2, 3 are formed in an integral fashion, and hence the number of components illustrated in FIG. 4 is three, namely, the main case parts 2, 3, and the elastic member 20. The main case 2, 3 is divided into two equal parts in a so-called 'vertical split' along a plane that is perpendicular to the central axis of the winding drum 6. When the tape measure is assembled, for example, one main case part 3 is placed on its side, the operating member 7 is mounted into the guide sections 14, 15, and the other main case part 2 is placed over same, whilst inserting the flange section 11 of the operating member 7 into the groove 16 of the other main case part 2. Thereby, the operating member 7 is held between the two main case parts 2, 3, and it assumes a correct position inside the main case 2, 3. In this way, the assembly of the operating member 7 is an extremely simple operation.

Referring back to FIG. 3, which illustrates a state where a winding drum 6, onto which a measuring tape 5 has been wound, and an operating member 7 are installed inside the main case illustrated in FIG. 4. This corresponds to the state in FIG. 1. The knob 4 is positioned in a rearward direction, and the engaging section 13 of the operating member 7 is engaged by the engaging section 19, such that the knob 4 is not able to move unintentionally. In this situation, the operating member 7 is in a state where it is not in contact with either the winding drum 6 or the measuring tape 5, namely, the locking piece 8 is not in contact with the measuring tape 5, and the braking piece 9 is not in contact with the winding drum 6. Consequently, the measuring tape 5 can be drawn out freely, and when the drawn out measuring tape 5 is released, it is wound in automatically, by the force of the spring.

Figure 6:
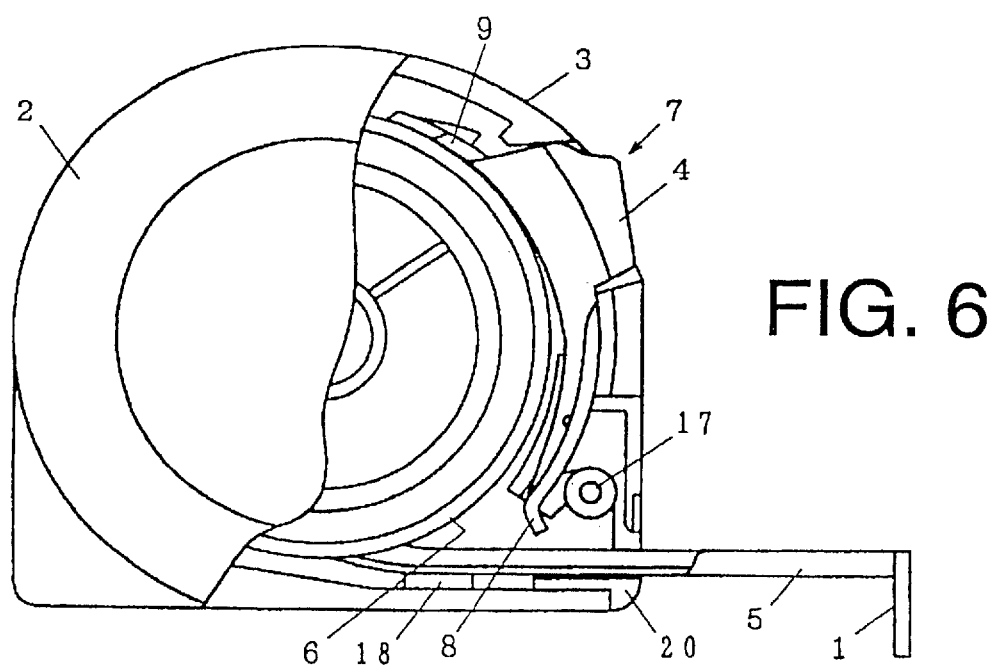
FIG. 6 illustrates a side view of the main case of the tape measure when in a provisionally halted state, wherein a portion of said case has been cut away in order to illustrate the interior thereof.

FIG. 6 illustrates a temporary halted state. After drawing out the measuring tape, the knob 4 is pressed radially inward towards the main case 2, 3. By so doing, the operating member 7 bends or flexes, and the braking piece 9 presses against the perimeter of the winding drum 6, thereby making it possible to retard the rotation of the winding drum 6. Since the braking piece 9 can be applied to contact the winding drum 6 in this way, when temporarily halting the extended measuring tape 5 in order to make a measurement, or in order to restrict the winding speed when the measuring tape 5 is wound in by the force of the spring, it is possible to avoid braking contact with the measurement scale face of the measuring tape.

Figure 7:
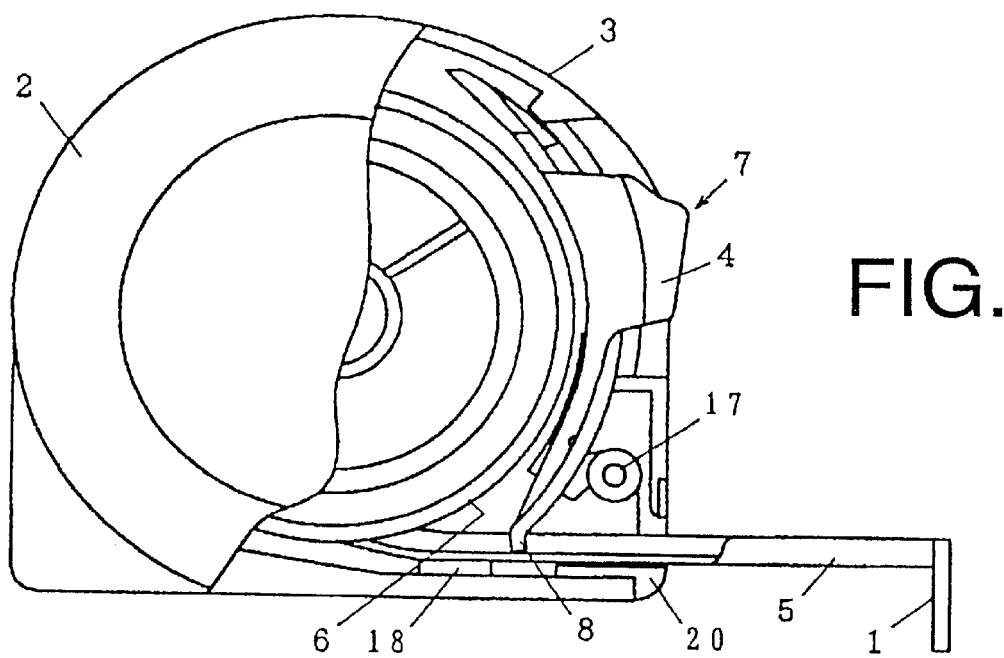
FIG. 7 depicts a side view of the main case of the tape measure, in a state where the knob has been moved forwards to an intermediate position, wherein a portion of said case has been cut away in order to illustrate the interior thereof.

FIG. 7 illustrates a state where the knob 4 has been moved circumferentially forwards to an intermediate position. This corresponds to the state in FIG. 2B. This state is achieved by pressing the knob 4 of the operating member 7 slightly, from the state in FIG. 3, in order to release the engagement of the engaging section 13 with the engaging section 19, and then moving the knob 4 cautiously in the forward direction. In the state shown in FIG. 7, the front end of the locking piece 8 contacts the measuring tape 5 in an extracted state. This state may also be used for the operation of applying a brake in order to restrict the winding speed, when the measuring tape 5 is wound in.

Figure 8:
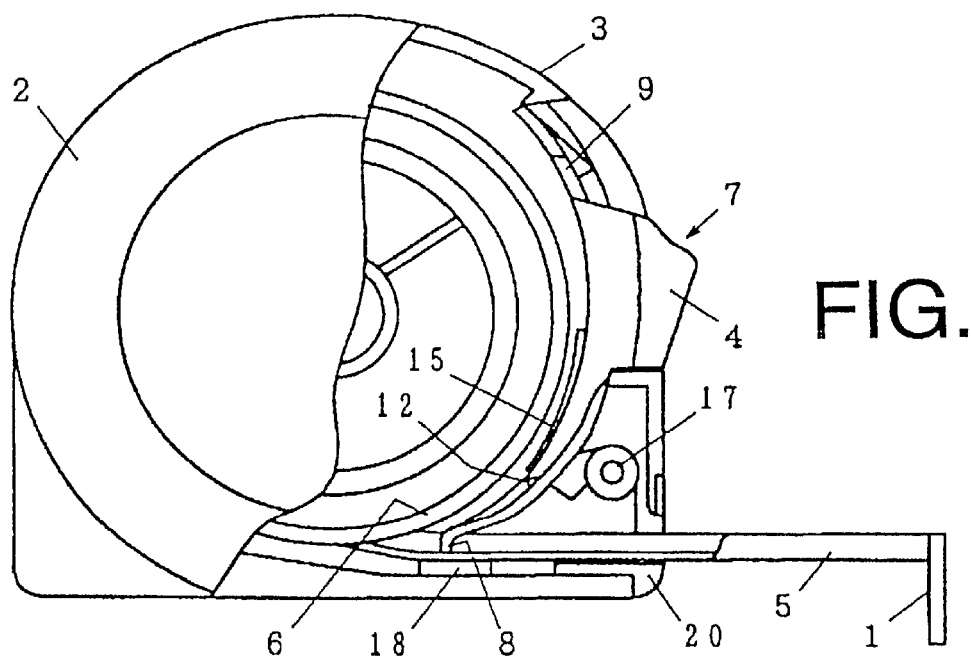
FIG. 8 depicts a side view of the main case of the tape measure, in a state where the knob has been moved further forwards, wherein a portion of said case has been cut away in order to illustrate the interior thereof.

FIG. 8 illustrates a state where the knob 4 is moved further forwards, and this corresponds to the state in FIG. 2A. Here, the guided section 10 and the flange section 11 are deflected to a relatively large degree in a radially inward direction, whilst at the same time, the lock position holding projection 12 is released from the front edge of the guide section 15. Thereafter, the edge of the guide section 15 forms an engaging section for the lock position holding projection 12, halting said lock position holding projection 12, and hence maintaining the operating member 7 in that position. Therefore, even if the user releases his or her finger from the knob 4, the operating member 7 will not return to its previous position, and the measuring tape 5 will be held between the locking piece 8 and the receiving section 18, by means of the elastic force of the guided section 10 and the flange section 11. Thereby, it is possible to lock the measuring tape 5 in an extended state.

This locked state is released by applying some force to the knob 4 to move it backwards, to the state illustrated in FIG. 7 or FIG. 3. In this case, the guided section 10 and the flange section 11 distort slightly, the engagement between the lock position holding projection 12 and the edge of the guide section 15 is released, and the lock position holding projection 12 rides over the edge of the guide section 15 and is able to move to the state in FIG. 7.

As the foregoing clearly illustrates, according to this tape measure, an advantage is obtained in that the operations of temporarily halting the tape from being retracted when it has been drawn out, braking the tape when it is wound in, and locking the tape when it has been drawn out, can all be performed in a simple manner, by a single thumb of the user's hand holding the tape measure. Moreover, since the brake can be applied to the winding drum, braking can be used without rubbing against the measuring tape, and hence it is possible to prevent the measurement scale from being worn or rubbed away. Furthermore, stopping and braking operations can be conducted commonly by means of the simple action of pressing the knob of the operating member, and therefore it is easy for a user to operate and to minimize mistakes. It is also feasible to respond quickly when it is observed that the winding speed has become too fast, thus providing excellent ease of use and safety. In addition to this, an advantage is obtained in that there is no increase in the number of components with respect to a conventional tape measure with a stopping mechanism, in other words, a braking action and locking action for provided by a single operating member, whilst avoiding any increase in cost.

The illustrated and described tape measure is disclosed in Japanese Patent Application No. 11-009652 filed on 18th January 1999 in JPO, the instant application claims priority of this Japanese Patent Application, and the entire disclosure of the aforementioned application is incorporated herein by reference.

INDUSTRIAL APPLICABILITY

The present invention may be applied to a tape measure including a flexible measuring tape accommodated inside a case.

What is claimed is:

1. A tape measure comprising:
   a main case;
   a winding drum having a measuring tape wound thereon, said winding drum rotatable in said main case to allow unwinding and rewinding of said measuring tape thereon;
   a flexible operating member, slidable on a side face of said main case to be movable circumferentially between a forward and rearward circumferential position thereon;
   a braking piece on a rear portion of said operating member; and,
   a locking piece on a front portion of said operating member, wherein a braking action is provided by means of said braking piece making contact with a periphery of said winding drum when said operating member is pressed radially inward when in said rearward circumferential position thereof to bend said operating member so as to deflect said rear portion of said operating member radially inward, and said measuring tape is locked by means of said locking piece being pressed against said measuring tape when said operating member is moved circumferentially to said forward position thereof.

2. The tape measure according to claim 1, wherein said operating member includes a lock position holding projection, and said operating member is held in a lock position by means of said lock position holding projection engaging with the main case, when said operating member is moved to the forward position.

3. The tape measure according to claim 1, wherein an engaging member which is engageable with an engaging member provided on the main case is provided in the rear portion of said operating member.

4. The tape measure according to claim 1, wherein said operating member has a curved shape which follows the outer circumference of said winding drum.

5. The tape measure according to claim 1, wherein said operating member is made from a flexible synthetic resin.

6. The tape measure according to claim 5, wherein said operating member is made from polyacetal.

7. The tape measure according to claim 1, wherein said main case includes a receiving section such that said measuring tape can be held between said locking piece and said receiving section.

8. The tape measure according to claim 1, wherein a guide section for guiding the movement of said operating member is provided in said main case, and the side faces of said operating member are slidably in contact with said guide section.

9. The tape measure according to claim 8, wherein a pair of said guide sections are provided on the inner side and outer side in the radial direction, a groove being formed in the position between these guide sections, and a flange section provided on said operating member being accommodated in said groove.

10. The tape measure according to claim 9, wherein a lock position holding projection is provided on said flange section, and said lock position holding projection engages with the end portion of said guide section provided on the inner side in the radial direction, whereby said measuring tape is held locked.

11. A tape measure comprising:
   a winding drum having a tension spring for automatically winding in a drum out measuring tape, accommodated inside a main case; and
   an operating member for imparting a braking or locking action by making contact with said winding drum or said measuring tape,
   wherein said operating member is installed to be movable circumferentially between forward and backward circumferential positions on said main case, and said operating member is formed in a curved shape and of a flexible material, a braking piece on a rear portion of said operating member, a locking piece on a front portion thereof, and a knob projecting from said main case on a middle portion of said operating member, said operating member when in said rearward position and released assuming a state of non-contact with either said winding drum or said measuring tape, thereby allowing said measuring tape to be drawn out or wound in freely, said operating member being configured such that when said knob is pressed radially inward from said a released state, the front portion of said operating member is bent to move said braking piece radially inward to make contact with the periphery of said winding drum, thereby applying a brake force to said measuring tape, said operating member further configured such that when said knob is moved circumferentially to an intermediate position, and said operating member is likewise moved to an intermediate between said rearward and forward position, said locking piece makes contact with said measuring tape, thereby applying a brake force to said measuring tape, said operating lever still further configured such that when said knob is moved circumferentially to a forward position, said operating member likewise being moved to said forward position, said forward portion of said operating member is caused to be bent, and said measuring tape being is held between said locking piece and said main case, thereby locking said measuring tape, when said knob is moved to said forward position.

12. The tape measure according to claim 11, wherein said operating member includes a lock position holding projection, and said lock position holding projection engages with said main case, thereby holding said operating member in a lock position, when said operating member is moved to the forward position.

13. The tape measure according to claim 11, wherein an engaging section which is engageable with an engaging section provided on said main case is provided in the rear portion of said operating member, said engaging section of said operating member being engaged, thereby restricting the forward and backward circumferential movement of said operating member, in a normal state in which said knob is released, and said engagement being released when pressure is applied to said knob.

14. The tape measure according to claim 11, wherein said operating member has a curved shape following the outer circumference of said winding drum.

15. The tape measure according to claim 11, wherein said main case includes a receiving section in order that said measuring tape can be held between said locking piece and said receiving section.

16. The tape measure according to claim 11, wherein a guide section for guiding the movement of said operating member is provided in said main case, and the side faces of said operating member are slidably in contact with said guide section.

17. The tape measure according to claim 16, wherein a pair of said guide sections are provided on the inner side and outer side in the radial direction, a groove being formed in the position between these guide sections, and a flange section provided on said operating member being accommodated in said groove.

18. The tape measure according to claim 17, wherein a lock position holding projection is provided on said flange section, and said lock position holding projection engages with the end portion of said guide section provided on the inner side in the radial direction, thereby locking said measuring tape in position.

* * * * *

UNITED STATES PATENT AND TRADEMARK OFFICE
CERTIFICATE OF CORRECTION

PATENT NO.   : 6,463,670 B1
DATED        : October 15, 2002
INVENTOR(S)  : Tsutomu Usami It is certified that error appears in the above-identified patent and that said Letters Patent is hereby corrected as shown below:

<u>Title page,</u>
Item [73], Assignee, should be spelled -- KDS Corporation --.

Signed and Sealed this

Twenty-sixth Day of August, 2003

JAMES E. ROGAN
*Director of the United States Patent and Trademark Office*